US008577079B2

(12) United States Patent  (10) Patent No.: US 8,577,079 B2
Cohen et al.  (45) Date of Patent: Nov. 5, 2013

(54) IMAGE PROCESSING SYSTEM PROVIDING SELECTIVE ARRANGEMENT AND CONFIGURATION FOR AN IMAGE ANALYSIS SEQUENCE

(75) Inventors: Avrum Isaac Cohen, Downingtown, PA (US); Dihui Hong, Chester City, PA (US)

(73) Assignee: Molecular Devices, LLC, Sunnyvale, CA (US)

( * ) Notice: Subject to any disclaimer, the term of this patent is extended or adjusted under 35 U.S.C. 154(b) by 105 days.

(21) Appl. No.: 13/225,021

(22) Filed: Sep. 2, 2011

(65) Prior Publication Data
US 2013/0058524 A1   Mar. 7, 2013

(51) Int. Cl.
*G06K 9/00*   (2006.01)

(52) U.S. Cl.
USPC .......................................... 382/100; 382/128

(58) Field of Classification Search
None
See application file for complete search history.

(56) References Cited

U.S. PATENT DOCUMENTS

| | | | |
|---|---|---|---|
| 2003/0113038 A1* | 6/2003 | Spencer et al. | 382/305 |
| 2006/0056703 A1* | 3/2006 | Sathyanarayana | 382/224 |
| 2008/0040044 A1* | 2/2008 | Dunlay et al. | 702/19 |

OTHER PUBLICATIONS

Alain Briot: "DxO Optics Pro v5—A Review and Tutorial" Feb. 2008, pp. 1-20.*
MetaMorph Microscopy Automation & Image Analysis Software [URL: http://www.moleculardevices.com/Products/Software/Meta-Imaging-Series/MetaMorph.html], Dec. 2011.
CellProfilier: Cell Image Analysis Software [URL: http://www.cellprofiler.org/], Dec. 2011.

* cited by examiner

*Primary Examiner* — Nirav G Patel
(74) *Attorney, Agent, or Firm* — Bella Fishman

(57) ABSTRACT

A computer-implemented method of processing a selected image using multiple processing operations is provided. An image analysis sequence having multiple processing steps is constructed. The image analysis sequence is constructed in response to receipt of multiple processing operation selections. Individual processing steps in the image analysis sequence are associated with a processing operation that is indicated in a corresponding processing operation selection. The processing steps are arranged in response to receipt of arrangement information that relates to a selective arrangement of the processing steps. At least one of the processing steps in the image analysis sequence is configured such that the processing operation associated with the processing step processes a specified input image to generate an output image when the processing step is performed. A display signal is generated for display of the output image at a display device.

11 Claims, 15 Drawing Sheets

IMAGE PROCESSING SYSTEM PROVIDING SELECTIVE ARRANGEMENT AND CONFIGURATION FOR AN IMAGE ANALYSIS SEQUENCE

FIELD OF THE INVENTION

This invention relates to image processing and more particularly to identifying and measuring objects in an image.

BACKGROUND

To extract meaningful data from biological images, researchers may execute a series of image processing and measurement operations on one or more biological images. Researchers apply processing and measurement operations to a biological image as a series of steps. Operation categories may include operations for modifying, manipulating, and measuring the biological images. Each category may include multiple operations configurable by a variety of parameters. As a result, many permutations of image processing and measurement sequences are possible.

Known image process and measurement systems may provide atomized operations or pre-defined image analysis sequences. Pre-designed image analysis sequences may not provide the flexibility to modify the sequence or the individual steps of the sequence. Additionally, while atomized operations may provide relatively more control over the image analysis sequence, researchers may have difficulty identifying how choices for the arrangement and configuration of the individual operations in the analysis sequence affect the analysis as a whole.

Therefore, a need exists for an image analysis system that provides feedback relating to the particular arrangement and configuration of the individual operations in the sequence.

SUMMARY

A computer-implemented method of processing a selected image using multiple processing operations is provided. An image analysis sequence having multiple processing steps is constructed. The image analysis sequence is constructed in response to receipt of multiple processing operation selections. Individual processing steps in the image analysis sequence are associated with a processing operation that is indicated in a corresponding processing operation selection. The processing steps are arranged in response to receipt of arrangement information that relates to a selective arrangement of the processing steps. At least one of the processing steps in the image analysis sequence is configured such that the processing operation associated with the processing step processes a specified input image to generate an output image when the processing step is performed. A display signal is generated for display of the output image at a display device.

An image analysis system for processing a selected image is also provided. A processing operation library provides multiple processing operations that respectively process the selected image when the processing operations are executed. An image analysis sequence module constructs an image analysis sequence having multiple processing steps in response to receipt of multiple processing operation selections. The individual processing steps in the image analysis sequence are associated with a processing operation that is indicated in a corresponding processing operation selection. The image analysis sequence module arranges the processing steps in the image analysis sequence in response to receipt of arrangement information that relates to a selective arrangement of the processing steps. The image analysis sequence module also configures at least one of the processing steps in the image analysis sequence module in response to receipt of configuration information such that the processing operation associated with the processing step processes a specified input image to generate an output image when the processing step is performed. A display signal is generated for display of the output image at a display device.

DETAILED DESCRIPTION

An image analysis system and method are provided. The image analysis system provides selective arrangement and configuration of steps in an image analysis sequence. The image analysis system also advantageously provides for the display of the results of each step in the image analysis sequence. If a user is dissatisfied with the results of a step in the image analysis sequence, the user may reconfigure that step or add additional steps to the sequence in order to achieve the desired results.

Figure 1:
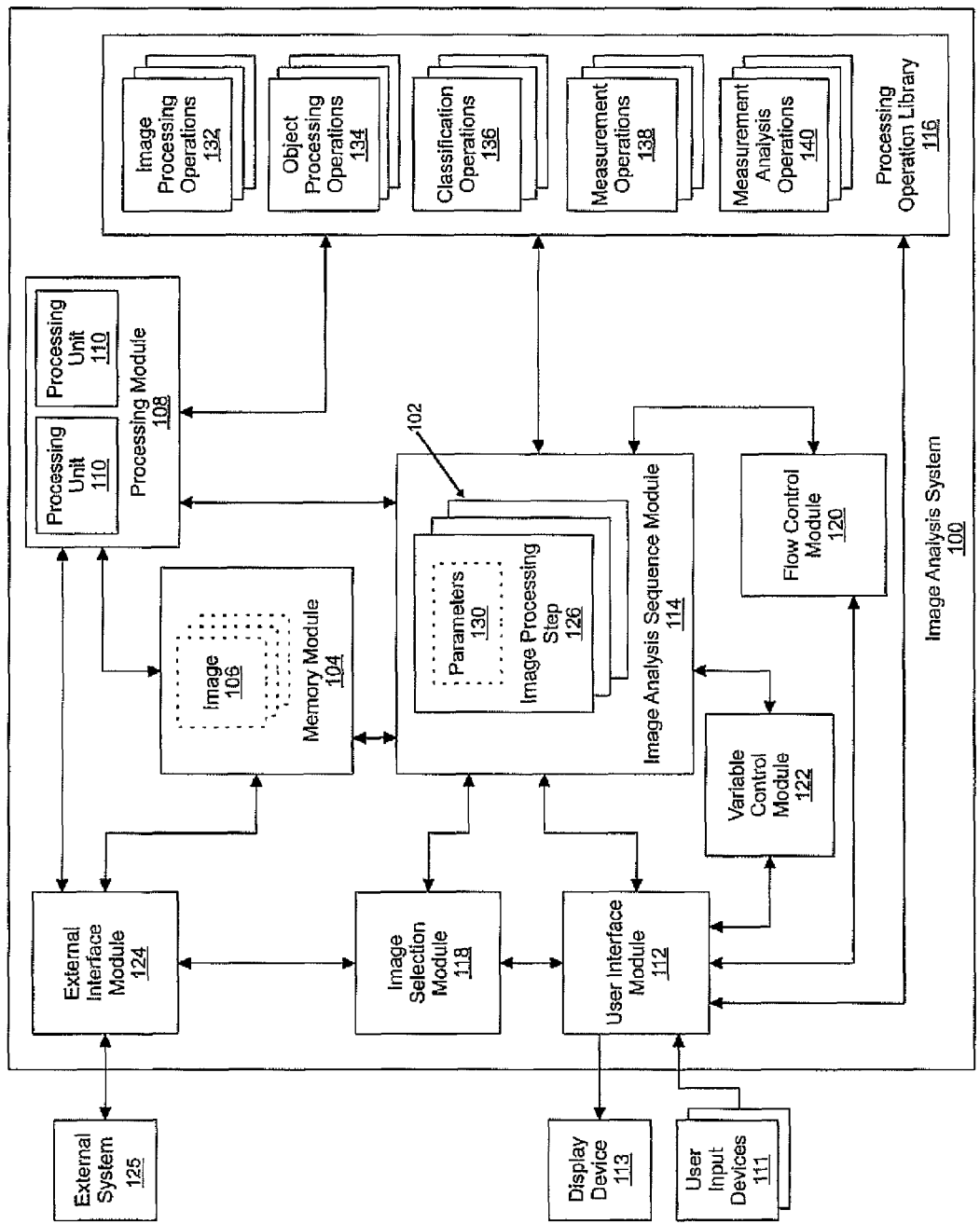
FIG. 1 is a block diagram of an example of an implementation of an image analysis system.

Referring to FIG. 1, an example of an implementation of an image analysis system 100 is shown. The image analysis system 100 includes various modules for creating and executing an image analysis sequence 102. As seen in FIG. 1, the image analysis system 100 includes: a memory module 104 that stores the images 106 processed by the image analysis system 100; a processing module 108 having one or more processing units 110 that executes instructions related to processing and analyzing the images 106; and a user interface module 112 that receives user input related to the image analysis sequence 102 and that displays information related to the image analysis sequence 102 and processing results. The user interface module 112 may receive the user input from one or more user input devices 111. The user interface module 112 may display information related to the image analysis sequence 102 on a display device 113. For example, the user interface module 112 may generate a display signal that includes a user interface (FIG. 3), and the user interface may include the results of the image analysis sequence 102.

The image analysis system 100 also includes: an image analysis sequence module 114 that maintains the image analysis sequence 102 under construction; and a processing operation library 116 having multiple processing operations and processing operation categories for processing and analyzing the images 106. In response to receipt of user input, the image analysis sequence module 114 constructs the image analysis sequence 102, arranges the processing steps 126 of the image analysis sequence 102, and configures the processing steps 126 of the image analysis sequence 102. Accordingly, the user input may include selections for the processing operations, arrangement information, and configuration information for selective construction, selective arrangement, and selective configuration of the image analysis sequence 102.

The image analysis system 100 may also include, as shown by way of example in FIG. 1: an image selection module 118 that provides selective access to the images 106 to be processed; a flow control module 120 that provides selective configuration of the order of execution of the processing steps 126 in the image analysis sequence 102; a variable control module 122 for creating variables for use as input parameters in the processing steps 126; and an external interface module 124 that manages communications between the image analysis system 100 and an external system 125 in signal communication with the image analysis system 100. The images 106 stored at the memory module 104 may be, for example, TIFF images (Tagged Image File Format) although other image formats may be selectively employed.

As seen in FIG. 1, the image analysis sequence module 114 maintains the image analysis sequence 102 under construction. The image analysis sequence 102 includes multiple processing steps 126 for processing and analyzing one or more images 106. In this example, the individual processing step 126 of the image analysis sequence 102 may be associated with a processing operation in the processing operation library 116. Corresponding processing operation selections may respectively indicate the processing operations for the processing steps 126. Additionally, the processing steps 126 may provide access to operational parameters 130 thus allowing a user to selectively configure the execution of the processing operations.

The processing operations may be selectively configured via inputs, process the inputs, and generate outputs when executed. The outputs for the processing operations may be, for example, processed output images, groups of objects identified in an image, measurement data, classification labels, and statistical data for the measurement data. The outputs of a processing step 126 in the image analysis sequence 102 may be selected as the inputs in another processing step 126 in the image analysis sequence 102.

The processing operation library 116, in this example, includes various processing operation categories each having multiple image operations. The processing operation library shown in FIG. 1 includes, for example: image processing operations 132; object processing operations 134; classification operations 136; measurement operations 138; and measurement analysis operations 140.

Image processing operations 132 relate to processing operations that process the image data in an image 106. For example, image processing operations 132 may include operations to adjust the pixels in an image 106 such as, e.g.: an operation to invert an image 106; an operation to remove bright regions of an image 106; an operation to remove dark regions of an image 106; and an operation to respectively adjust the intensity of the pixels in the image 106. Image processing operations 132 may also include operations that operate on multiple images 106. For example, the image processing operations 132 may include operations that compare two images 106 such as, e.g.: an image processing operation that generates a difference image by subtracting one image 106 from another image 106; an image processing operation 132 that generates a ratio image by taking the ratio of one image 106 to another; and an image processing operation 132 that determines a change in fluorescence between two images 106. An image processing operation 132 may also generate more than one image 106. For example, a color un-mixing operation may separate an image 106 into its component colors, i.e., generate three images 106 each respectively corresponding to the red, green, and blue (RGB) channels of the image 106. Other image processing operations 132 may include, for example: an operation to correct for uneven illumination in an image 106; an operation to generate a projection image from an image 106 acquired through a focus; and operations for smoothing an image 106 and unsharp masking an image 106. It will be understood that additional or alternative image processing operations 132 may selectively be employed.

Object processing operations 134 relate to processing operations that identify and modify objects in an image 106. Object identification operations may include both object detection operations and object segmentation operations. Object detection operations determine whether an object is present at a location in an image 106 and identify a set of objects for an image 106; this process may be referred to as object detection. Object segmentation operations determine, for example, which pixels in an image 106 are associated with a detected object; this process may be referred to as object segmentation. Object modification operations 134 may, for example, may modify the segmentation (i.e., the set of pixels) associated with a detected object. Additional or alternative object processing operations 134 may be selectively employed.

The object identification operations, in this example, may send information relating to the identified objects to the memory module 104 for storage in respective data structures (not shown). The object data structures may include, for example, information relating to the position of the object in the image 106, the set of objects an object belongs to, and the segmentation for the object (i.e., the image pixels associated with the object). The object segmentation operations 134 may, for example, determine a pixel run list for a detected object. A pixel run list is a list of pixel runs for an object. A pixel run includes an (x, y) pixel coordinate and the number of consecutive pixels along the horizontal x-axis that are associated with a detected object. The pixel run list may also be extended for three-dimensional objects distributed across a series of two-dimensional images 106 by adding a third z-coordinate to the pixel run. Object segmentations may be generated from an image 106 using, for example, a local or adaptive threshold, graph cut procedures, template matching or template fitting, a watershed applied to the image 106, an initial set of seed segmentations, machine learning techniques, etc. Object detection can be performed using, for example, with or without object segmentation techniques, using, for example, template matching or template fitting, machine learning or trained systems, peak detection, and the like.

Figure 2A:
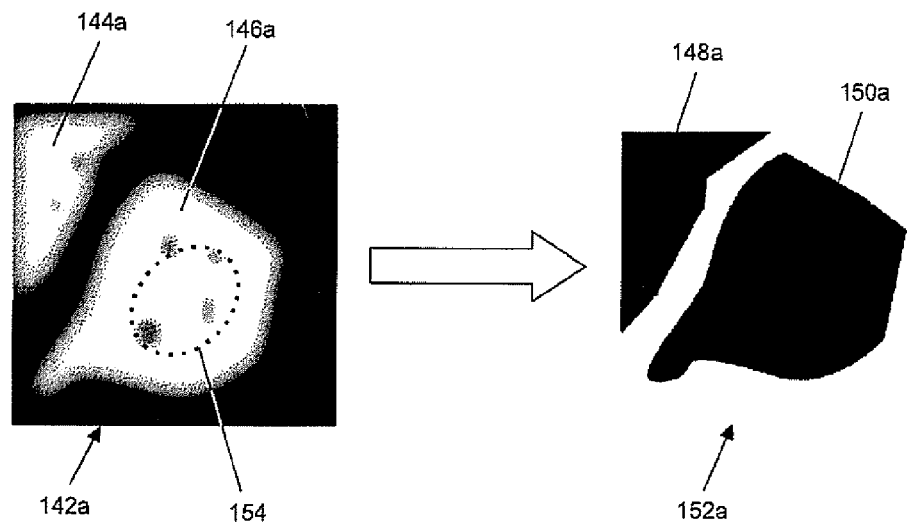
FIG. 2A is an image that may be processed by an image analysis system.
Figure 2B:
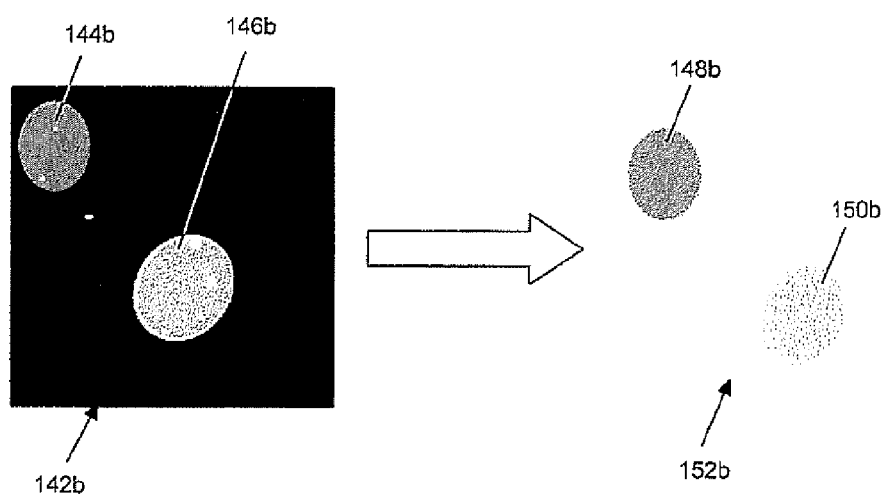
FIG. 2B is another image corresponding to the image in FIG. 2A that may be processed by an image analysis system.

Referring to FIG. 2A and FIG. 2B, two examples of object detection and object segmentation are shown. The images in FIG. 2A and FIG. 2B correspond to a biological sample imaged under different illumination conditions. The image 142a in FIG. 2A was acquired under one illumination condition to reveal a cytoplasm marker. The image 142b in FIG. 2B was acquired under a different illumination condition to reveal a nuclear marker. As seen in FIG. 2A, the image 142a includes two blob-shaped elements 144a and 146a that correspond to the cells in the biological sample. Similarly, in FIG. 2B, the image 142b includes two oval-shaped elements 144b and 146b that correspond to the nuclei for the cells in the biological sample.

An object detection operation may determine that two objects—148a and 150a in FIG. 2A and 148b and 150b in FIG. 2B—are present in each of the images 142a and 142b based on the blob-shaped elements 144a and 146a in FIG. 2A and the oval-shaped elements 144b and 146b in FIG. 2B. Accordingly, the object detection operation may create a respective object set for each image: a first object set 152a for the image 142a in FIG. 2A that includes two blob-shaped objects 148a and 150a; and a second object set 152b for the image 142b in FIG. 2B that includes the two oval-shaped objects 148b and 150b. Further, because the objects 144a-b and 146a-b are different representations for the same cells in the biological sample, the object detection operation may identify and store a relationship between the objects 144a-b and 146a-b. For example, the object identification operation may identify: a relationship between the first object 144a in FIG. 2A and the first object 144b in FIG. 2B; and a relationship between the second object 146a in FIG. 2A and the second object 146b in FIG. 2B. Identifying relationships between objects identified in different images 106 (FIG. 1) may allow the image analysis system 100 to track objects across a series of images 106. Additionally, an object segmentation operation may determine which pixels in the images 142a and 142b of FIG. 2A and FIG. 2B correspond to each blob-shaped object 144a and 146a and each oval-shaped object 144b and 146b respectively. In this way, the image analysis system may use an object identified in one image when processing and analyzing another image. As shown in FIG. 2A for example, the second object 146b in FIG. 2B may be used to determine the maximum pixel intensity in FIG. 2A within the pixel area 154 for the object.

Referring back to FIG. 1, the processing operation library 116, in this example, also includes various object processing operations 134 to modify objects in an image 106, i.e., adjust the segmentation associated with an object. As an example, an object modification operation 134 may expand or shrink the segmentation for the object by respectively adding pixels to or removing pixels from the segmentation associated with the object.

Object processing operations 134 may further include operations to find objects in an image 106 and create a new set of objects for the image 106 based on one or more criteria. For example, a filtering operation as part of the object processing operations 134 may create a new set of objects for an image 106 based on the size, shape, or the texture of the segmentation associated with an object.

Object processing operations 134 may also create new images 106 based on the objects detected in an image 106 and the segmentations associated with the detected objects. For example, an object processing operation 134 may create a binary image based on an object set for an image 106 where the pixel intensity of a pixel in the binary image equals 1 if the corresponding pixel is associated with an object and equals 0 if the corresponding pixel is not associated with an object. A binary image is an image where each pixel in the image is one of two possible colors (e.g. black and white).

The processing operation library 116, in this example, also includes measurement operations 138. Measurement operations 138 relate to operations that measure various properties of the identified objects in an image 106. The measurement operations 138 may include, for example, operations to measure the size, shape, texture, and pixel intensity of segmentations respectively associated with detected objects in an image 106. Measurement operations 138 may also measure objects across multiple images 106. For example, an object measurement operation 138 may determine the velocity of an object moving through a biological sample. As another example, an object measurement operation may determine a ratio of pixel intensities for objects in a series of images 106 that are acquired under different illumination conditions as discussed above. The measurement operations 138 may store measurements associated with identified objects or object sets at the memory module of the image analysis system 100. Additional measurement operations 138 may include, for example, volumetric measurements of objects collected in a z-series of images as well as measurement operations to measure biologically relevant values (e.g., nuclear intensity, vesicle count, neuronal branches, etc.).

In addition to measurement operations 138, the processing operation library 116, in this example, includes measurement analysis operations 140 that relate to operations for analyzing the measurement data and generating representations of the measurement data. For example, the measurement analysis operations 140 may include operations to perform curve fitting, peak detection, and other statistical analyses on the measurement data for the objects in an image. The measurement analysis operations 140 may also include operations to generate, for example, graphical displays of the measurement data or data related to the statistical analyses of the measurement date. For example, measurement analysis operations 140 may create graphs, charts, tables, histograms, and other graphical representations of the measurement data for visual presentation of the information.

The processing operation library 116, in this example, also includes classification operations 136, which relate to operations that classify (or categorize) identified objects in an image 106. The classification operations 136 may classify identified objects based on, for example, the measurement data associated with the objects (e.g., size, shape, texture, pixel color, pixel intensity, etc.). Various automated, semi-automated, or machine learning approaches may be employed to classify the identified objects based on the measurement data. Automated clustering techniques may be selectively employed for object classification, e.g., clustering, self-organizing maps, neural networks, Bayesian-Markov chains, etc. The classification operations 136 may label an object to identify the class or category the object belongs to. The memory module 104 may store the classification label in the data structure for the object.

It will be understood that, in this example, a user may set an output image (or series of output images) generated by one processing operation of one image processing step 126 as an input image parameter 130 (or series of input images) for a processing operation of a subsequent image processing step 126. For example, if an image inversion operation generates an inverted image as an output image, then inverted image may be set as the input image parameter 130 for an object detection operation to detect objects in the inverted image. Likewise, an object (or object set) identified by one operation may be set as an input parameter 130 for a subsequent operation. For example, a find object operation may generate a set of objects in an image that match an illumination condition, and the set of objects matching the illumination condition may be set as an input parameter 130 for a subsequent grayscale operation. Similarly, the measurement data set generated by a measurement operation 138 may be set as an input data set parameter 130 for a subsequent measurement analysis operation 140.

The image analysis system 100 may also include a flow control module 120 that may be used to control the flow of the image analysis sequence 102. The flow control module 120 may provide sequence flow options that implement, for example, a loop in the image analysis sequence 102 such that one or more processing steps 126 in the image analysis sequence 102 are repeated when the sequence 102 is executed. The flow control module 120 may also provide sequence flow options to implement, for example, conditional execution of the image analysis sequence 102 such that different processing steps 126 are executed depending upon whether a condition is satisfied. As another example, the flow control module 120 may additionally provide sequence flow options to implement interrupts during execution of the image analysis sequence 102 so that the image analysis system 100 may receive user input before continuing execution of the image analysis sequence 102. When the flow control module 120 interrupts execution of the image analysis sequence 102, the user may, for example: set or modify input parameters 130 for a processing step 126; adjust the current display of the image 106; select measurement data, a subset of objects in an object set, or regions of interest on an image 106 for further processing and analysis. Additional or alternative interactive steps 126 may be selectively employed. When the user has finished, the user may instruct the image analysis system 100 to continue executing the image analysis sequence 102 by selecting, for example, a "Continue" button. A user may adjust the flow control settings for an image analysis sequence 102 using, for example, scripts or programmatic statements supplied to the image analysis system 100. Flow control statements may also be implemented, for example, as steps 126 in the image analysis sequence 102 with start value, end value, and increment as the parameters 130 for the flow control step. In turn, one or more image processing steps may be associated with the flow control step for execution in accordance with the flow control parameters 130. Flow control steps may include, for example, looping steps, "for/next" steps, "if/then/else" steps, "repeat until" steps, etc. As an example, a flow control step 126 may be included in an image analysis sequence 102 to grow an object by four pixels ten times (i.e., loop ten times) or, alternatively, grow an object until (i.e., repeat until) the object is one hundred pixels wide).

The image analysis system 100 may additionally include a variable control module 122. As mentioned above, users may configure the processing operations associated with the processing steps 126 of the image analysis sequence 102 using various input parameters 130. The values for the input parameters 130 may be fixed (e.g., fixed numerical values) or variable. The variable control module 122 provides options to define variables for use as input parameters 130 for the processing operation of the processing step 126. As an example, the image analysis sequence 102 may include a processing step 126 for a measurement operation that measures the maximum pixel intensity of segmentations for detected objects in an image 106. A user may define a variable that equals, for example, the maximum intensity value divided by two (i.e., $var_1 = Intensity_{max} \div 2$). The variable may then be set as the value for an input parameter 130 in a step for a filter operation that filters objects in an image 106 based on the respective intensities of the object segmentations.

Still referring to FIG. 1, the image analysis system 100 may also include an image selection module 118 for managing access to images 106 processed and analyzed by the image analysis system 100. As discussed above, output images may be used as input images for processing operations of subsequent image processing steps 126 in the image analysis sequence 102. The image selection module 118 provides access to images 106 other than those currently being processed and analyzed. The image selection module 118 may provide direct access to a particular image 106 in an image series based on, for example, a particular time point (e.g., time point 1 or time point 10) or z-position (e.g. z-position 1 or z-position 10). Additionally, the image selection module 118 may provide relative access to an image in an image series (e.g., current time point minus one, current time point minus ten, current z-position minus one, z-position minus 10, etc.). The image selection module 118 may also provide access to an image 106 in an image series based on a combination of direct and relative values (e.g., current time point minus one and z-position 10). The image selection module 118 may also provide access to images external to the image analysis system at an external system 125.

The external system 125 may be, for example, a file system, a database, or a network (e.g., the Internet). Accordingly, the image selection module 118 may retrieve images using, for example, a filename, a uniform resource identifier (URI) such as a uniform resource locator (URL), or a database query. The image analysis system 100 may be in signal communication with additional or alternative external systems 125 and may employ additional or alternative approaches to retrieving images.

The external system 125 may also be, for example, a bioanalytical instrument that images biological samples to generate biological images. The bioanalytical instrument may be, for example, a high-content screening system that performs cellular imaging to generate microscopy images. Accordingly, the image analysis sequence module 114 of the image analysis system 100 may receive microscopy images from the bioanalytical instruments. The image analysis system 100 may be in signal communication with additional or alternative bioanalytical instruments that image biological samples.

The external system 125 may also be an auxiliary system that includes auxiliary image processing modules that may assist some of the processing operations during execution of the image analysis sequence 102. The image analysis system 100 may exchange image data and measurement data with these auxiliary systems and auxiliary image processing modules during execution of the image analysis sequence 102. The auxiliary image processing modules may include, for example, MetaMorph® Microscopy Automation & Image Analysis Software, ImageJ, Matlab®, and the like. The image analysis system 100 may communicate with these auxiliary image processing modules via the appropriate application programming interface (API) for the modules. The image analysis system 100 may be in signal communication with additional or alternative auxiliary systems and image processing modules.

The image analysis system 100 may be in signal communication with the external system 125 in a wired or wireless fashion via an external communication interface 124. Accordingly, the external communication interface 124 may be any type of external bus or communication interface such as, for example, universal serial bus (USB), Ethernet port, or wireless transceiver that exchanges wireless communications with the external system 125.

The image analysis system 100 also includes a user interface module 112 that receives user input related to the creation, modification, and execution of the image analysis sequence 102. The user interface module 112 also displays information related to the image analysis sequence 102 and the results of the image analysis sequence 102. The user interface module 112 may be in signal communication with a display device 113 and one or more user input devices 111. The display device 113 may be any device capable of converting electrical signals into a visually perceivable form. For example, the display device 113 may be, but is not limited to, a liquid crystal display (LCD), a cathode-ray tube (CRT) display, an electroluminescent display (ELD), a heads-up display (HUD), a plasma display panel (PDP), an organic light emitting diode (OLED) display, a vacuum fluorescent display (VFD), and the like. The user interface devices 111 may include, for example, a keyboard, a keypad, a pointing device (joystick, stylus, mouse, touchpad, touchscreen, trackball, and the like), and other input devices suitable for providing user input to the image analysis system.

Figure 3:
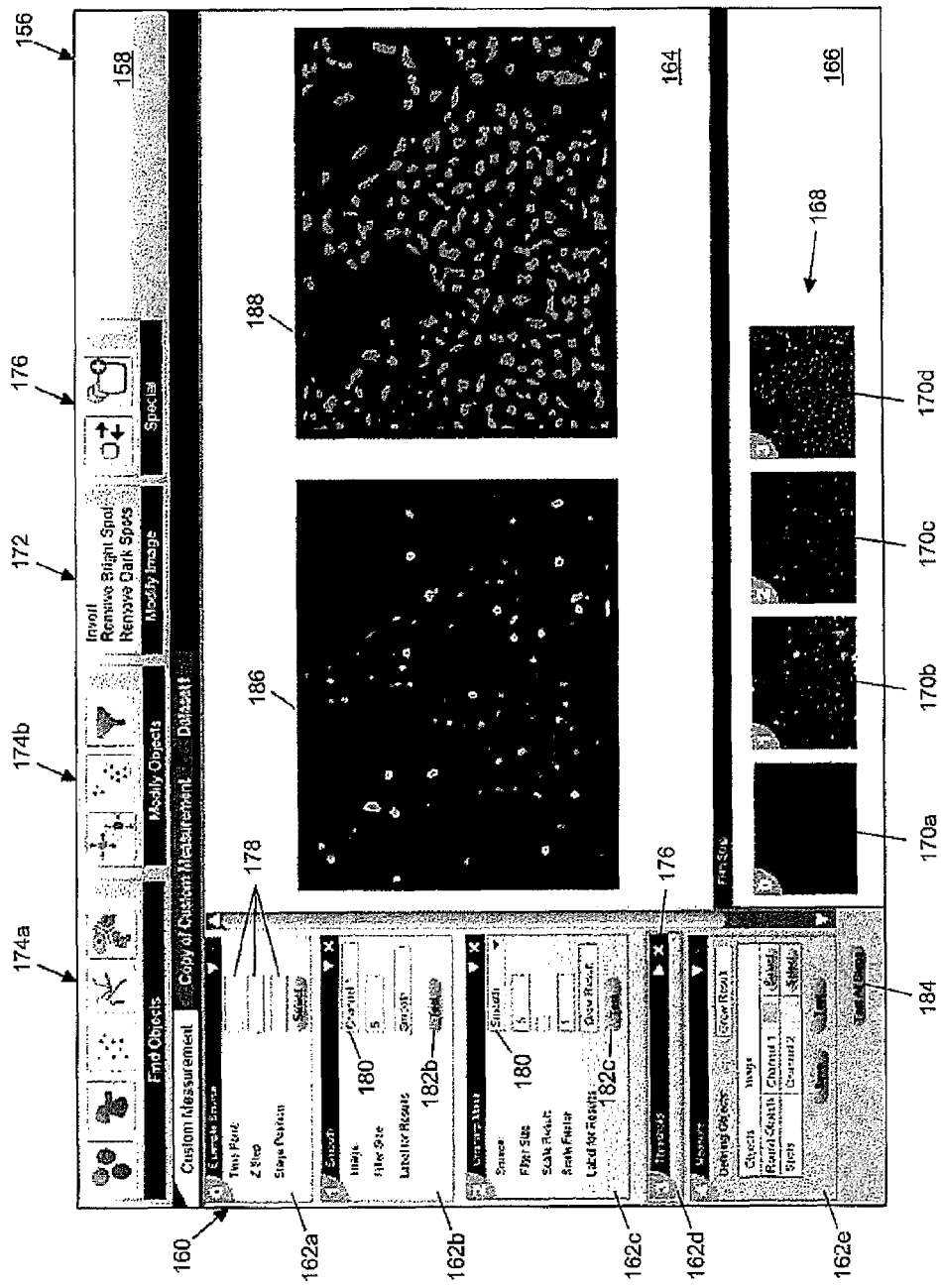
FIG. 3 is an example of a user interface for an image analysis system.

Referring now to FIG. 3, an example of an implementation of a user interface 156 for an image analysis system 100 is shown. As seen in FIG. 3, the user interface 156 includes various components for creating and configuring an image analysis sequence 160 and viewing the results of the image analysis sequence 160. In this example, the user interface 156 includes: an operation toolbar 158 that provides the operations available for the image analysis sequence; an image analysis sequence 160 that displays the steps 162 of the image analysis sequence under construction; an operation result display 164 the displays the results for the currently selected step 162 in the image analysis sequence 160; and an output image sequence display 166 that displays an output image sequence 168. The output image sequence 168 includes the output images 170 generated by the processing operations respectively associated with the processing steps 162 in the image analysis sequence 160. The user interface 156 may also include a component (not shown) to display the measurement analysis results (i.e., the graphs, charts, tables, histograms, etc. for the measurement data).

The operation toolbar 158 may include sub-components for selecting an operation to include in the image analysis sequence 160. The sub-components may be associated with the operation categories in the processing operation library 116 (FIG. 1). In this example, the operation toolbar 158 includes a sub-component 172 associated with the image processing operations 132 for modifying an image. The operation toolbar 158 also includes sub-components 174 associated with the object processing operations 134, e.g., a sub-component 174a for operations that identify objects in an image (i.e., detected and segment objects) and a sub-component 174b for operations that modify objects in an image. The operation toolbar 158, in this example, also includes a sub-component 176 associated with the image selection module 118 that provides access to images processed and analyzed by the image analysis sequence 160. Additionally, a user may use the image selection module 118, in this example, to manage sets of images 106 (FIG. 1). For example, a user may add an output image generated by a step 162 in the image analysis sequence 160 to a set of images. The operation toolbar 158 may also include sub-components (not shown) for the measurement operations 138, measurement analysis operations 140, and classification operations 136 (FIG. 1).

When a user selects an operation from the operation toolbar 158, the selected operation is added as a step 162 in the image analysis sequence 160. As seen in FIG. 3, the steps 162a-d of the image analysis sequence 160, in this example, respectively correspond to the output images 170a-d displayed in the output image sequence display 166 in the order of their execution. A user may add, remove, rearrange, or reconfigure steps 162 in the image analysis sequence 160. A user may add steps 162 to the image analysis sequence 160 by selecting a new operation from the operation toolbar 158. A user may remove steps 162 from the image analysis sequence 160 by, for example, selecting the "X" button 176 on the step or, in an alternative implementation, dragging the step out of the image sequence listing. A user may rearrange the steps 162 in the image analysis sequence by, for example, dragging a step to a new position in the image analysis sequence 160. A user may reconfigure a step 162 in the image analysis sequence by adjusting the parameters 178 of the step. The steps 162 in the image sequence 160 may be collapsible such that the parameters 178 for the step are displayed when the step is not collapsed—e.g., steps 162a-c (steps 0-2)—and hidden when the step is collapsed—e.g., step 162d (step 3).

One of the input parameters 178 may be, for example, an input parameter 180 that specifies the source of the input data for the processing operation associated with the step 162. The input data for the input parameter 180 may be, for example, data from a previous step 162 in the image analysis sequence 160 such as, for example, an output image (or set of images), an identified object (or set of identified objects), or measurement data. As seen in the example user interface 156 of FIG. 3, the input parameter 180b for the "Smooth" step 162b (step 1) in the image analysis sequence 160 is an image and originates on "Channel 1." The input parameter 180c for the "Unsharpen Mask" 162c (step 2) in the image analysis sequence 160 of FIG. 3 is the output image of the "Smooth" step 162b.

Additionally, the user interface 156 in the example shown, the steps 162 of the image analysis sequence 160 include a button 182 to test (or run) the execution of a step 162 in the image analysis sequence. The user interface 158, in this example, also includes a button 184 to test all of the steps 162 in the image analysis sequence 160 under construction. When a user selects a button 182 to test one of the steps 162 in the image analysis sequence 160, the image analysis system 100 executes the processing operation associated with the step using the input data (e.g., an input image) that is set as the input parameter 180 for the step. The processing operation for the step 162 may generate output as a result. The output of an executed processing operation may be, for example, an output image (or set of output images), a detected object (or set of detected objects) detected in the image, or measurement data. The user interface 156, in this example, also includes a button 184 to test the entire image analysis sequence 160 in which the image analysis system 100 iterates over each step 162 in the image analysis sequence and executes the processing operations respectively associated with the steps.

The user interface may display the results of a selected step 162 in the image analysis sequence 160 in a results display component 164. In the example shown, the results display 164 displays the input image 186 for the selected processing step 162d (step 3, "Threshold") next to the output image 188 for the processing step. In this way, a user may determine whether the output image 188 is satisfactory. If the user determines that the output image 188 is not satisfactory, then the user may adjust the parameters 178 for the selected processing step 162*d* or add additional steps to the image analysis sequence. The user may add additional steps 162 to the image analysis sequence 160 in order to use a different input image for the selected processing step 162*d*. As shown by way of example in FIG. 3, the "Threshold" step 162*d* (step 3) in the image analysis sequence 160 is selected, and the results display component 164 displays the input image 186 for the processing step next to the output image 188 generated by the processing operation associated with the processing step.

Additionally, the user interface 156, in this example, includes an output image sequence display 166 to display an output image sequence 168. In this example, the output image sequence displays the output images 170 generated by the processing operations associated with the processing steps 162 of the image analysis sequence 160. The output image sequence display 166 may display the output images 170 as thumbnail images simultaneously and arrange the output image sequence 168 in sequential order according to the processing step 162 the output images 170 are respectively associated with. As seen in the example image analysis sequence 160 of FIG. 3, the output image sequence display 166 displays four output images 170. The first output image 170*a* (image 0) corresponds to the sample image selected for the "Example Source" step 162*a* (step 0); the second output image 170*b* (image 1) corresponds to the output image for the "Smooth" processing step 162*b* (step 1); the third output image 170*c* (image 3) corresponds to the output image for the "Unsharpen Mask" processing step 162*c* (step 2); and the fourth output image 170*d* (image 4) corresponds to the output image for the "Threshold" processing operation in step 162*c* (step 3). In this example, the measurement step 162*e* (step 4) may include parameters for the selecting one or more measurement operations or measurement analysis operations to perform on the objects of the images.

In this way, the image analysis system 100 advantageously displays the results of the individual processing steps in the image analysis sequence 160 simultaneously. If the user is dissatisfied with the results of the image analysis sequence 160, the output image sequence display 166 enables the user to identify relatively quickly which step 162 in the image analysis sequence may cause the unsatisfactory output image 170. Having identified the suspect step 162 in the image analysis sequence 160, a user may adjust the parameters 178 of the step or add additional steps to the image analysis sequence as discussed above. Further, displaying the input image 186 next to the output image 188 in the results display advantageously enables a user to configure and test a selected step 162 in the image analysis sequence. If the user is dissatisfied with the output image 188 for the selected step 162, the user may adjust the selected step or the image analysis sequence 160 as discussed above and retest the selected step. The user may repeat these procedures until satisfactory results are achieved. If the image processing and object processing results for the image analysis sequence 160 are satisfactory, a user may add additional steps 162 to the image analysis sequence such as, for example, steps associated with classification operations, measurement operations, and measurement analysis operations. Again, if the user is dissatisfied with the results of the classification, measurement, or measurement analysis operations, the user may modify the image analysis sequence 160 or any step in the image analysis sequence to achieve the desired results.

In some implementations, an image processing step 162 may be color coded based on the emission wavelength of the input image. The user interface 156 may display the step 162 as tinted with the color of the input image, e.g., the background for the image processing step 162 may be colored accordingly. The color associated with the image processing step 162 may also be passed down to subsequent image processing steps, which may be similarly tinted in turn. For example, if an input image to a "smooth" operation has an emission wavelength of around 440 nm (i.e., blue), then the step 162 for the smooth operation may be tinted blue in the user interface 156. Additionally, the output image for the "smooth" operation may also have a blue emission wavelength such that subsequent steps 162 that use the output image of the "smooth" operation as an input image are also tinted blue in the user interface 156. The backgrounds of the output images 170 in the output image sequence display 166 may also be tinted and color-coded accordingly.

Once a user determines the image analysis sequence 160 is satisfactory, the image analysis sequence may be saved and stored at the memory module 104 of the image analysis system 100. The image analysis sequence 160 may be saved as, for example, an XML file. The XML file may include, for example, a structured list of the processing steps 162 in the image analysis sequence, the processing operations associated with each processing step, the parameters 178 for the processing steps, and other information relating to the image analysis sequence. A user may then select the image analysis sequence 160 as an individual step when creating subsequent image analysis sequences. The image analysis sequence 160 may also be shared by transmitting the image analysis sequence to other image analysis systems for use at those systems.

Figure 4A:
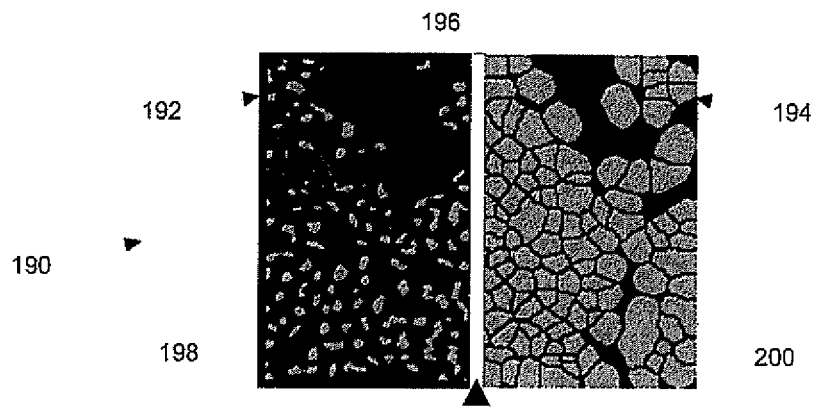
FIG. 4A is an example of an image display component in a first example configuration.
Figure 4B:
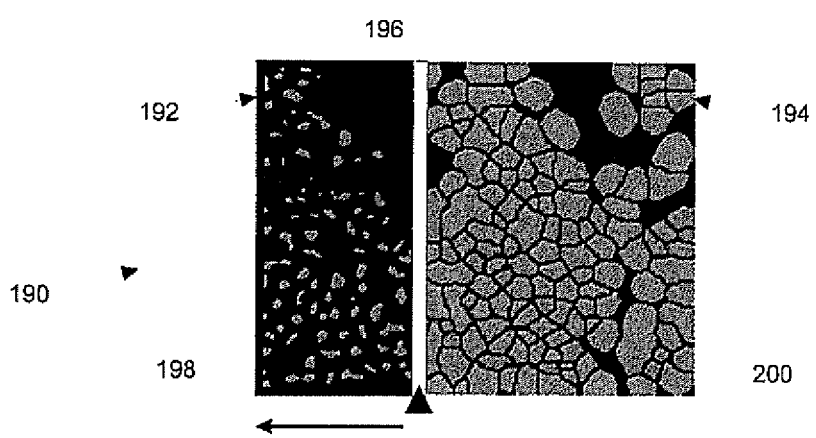
FIG. 4B is the example image display component of FIG. 4A in a second example configuration.
Figure 4C:
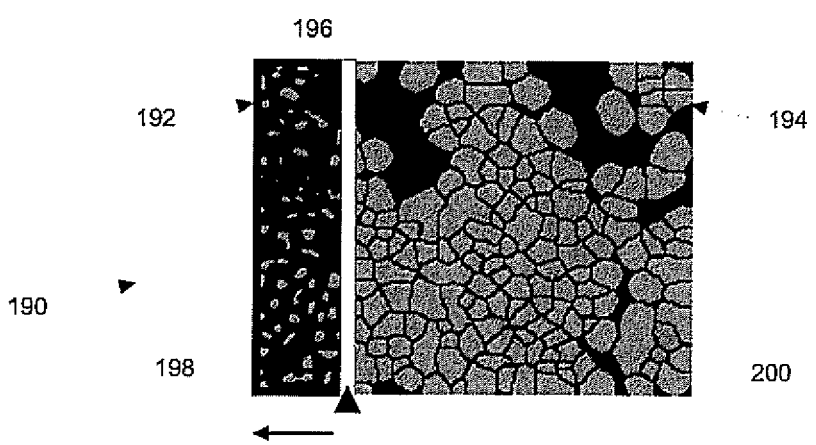
FIG. 4C is the example image display component of FIG. 4A in a third example configuration.

Referring to FIGS. 4A-C, an alternative results display component 190 for displaying an input image 192 and output image 194 is shown. Instead of displaying the input image 192 and the output image 194 next to each other, the alternative display component 190, in this example, aligns the input image and the output image on top of each other such that the input image and the output image are in a stacked arrangement. A horizontally sliding vertical divider 196 splits the stacked images 192 and 194 into a left portion 198 and a right portion 200. The display component 190 in this alternative example displays one of the images on one side of the divider and displays the other image on the opposite side of the divider. In the example shown in FIG. 4A, the input image 192 is displayed to the left of the divider 196, and the output image 194 is displayed to the right of the divider 194. Sliding the divider 196 horizontally reveals more of one image and less of another image. As shown by way of example in FIG. 4B and FIG. 4C, as the divider 196 slides horizontally leftward, more of the output image 194 is revealed. Sliding the divider 196 horizontally rightward, in these examples, will reveal more of the input image 192. In this way, users may advantageously focus their attention on a region in the input image 192 and output image 194, slide the divider 196 across the region, and compare the changes between the input image and the output image.

Referring now to FIGS. 5A-G, illustrate how a user may construct an image analysis sequence 202 using the image analysis system 100. The processing steps in the image analysis sequence 202, in this example, process a sample source image 204 to identify and measure objects in the image.

Figure 5A:
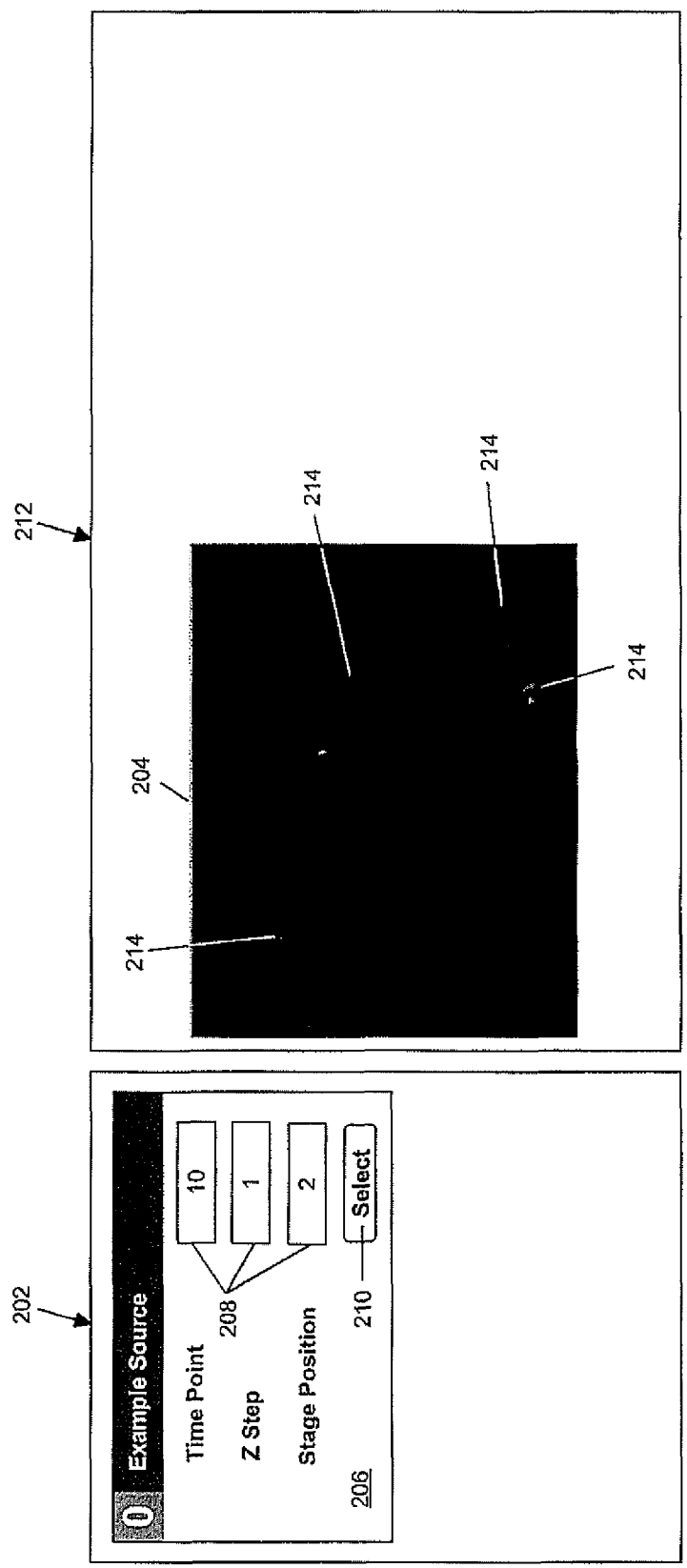
FIG. 5A is an example of an image analysis sequence with the results for the image analysis sequence.

Referring to FIG. 5A, the first step 206 in the image analysis sequence 202 is shown. In this example, the first processing step 206 (step 0, "Example Source") selects a sample source image 204 for processing. As seen in FIG. 5A, the input parameters 208 for the image selection step 206 indicate that the image at time point 10, z-position 1, and stage position 2 should be selected as the sample source image for the image analysis sequence 202. The image selection step 206, in this example, also includes a "Select" button 210 to load the sample source image 204 in the results display 212. As seen in FIG. 5A, the sample source image 204 includes multiple objects 214 a user may want to identify and measure. As discussed above, the user may identify objects 214 in the image 204 by adding an object processing step to the image analysis sequence 202 such as, for example, a threshold operation to compare the pixels in the sample source image to a predetermined threshold.

Figure 5B:
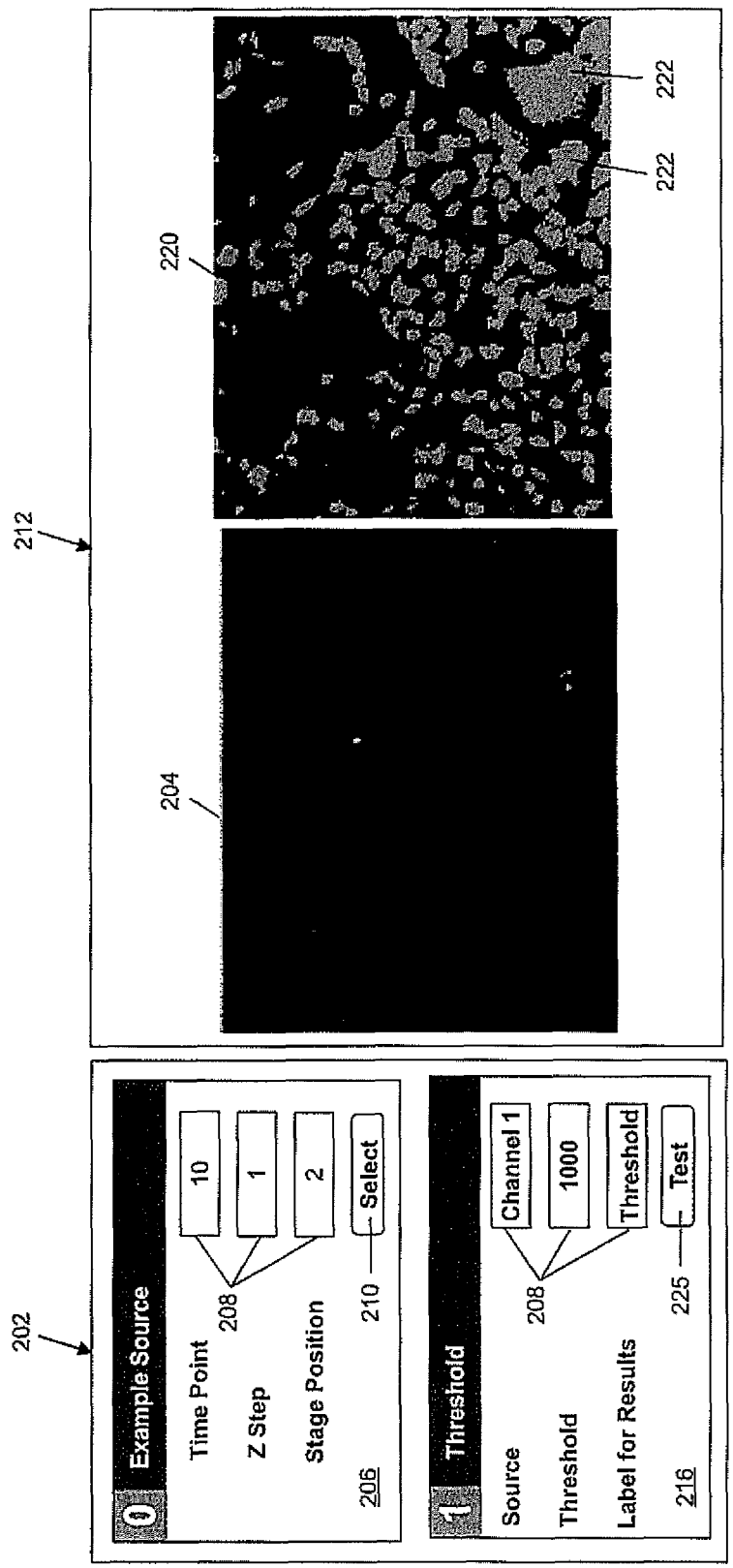
FIG. 5B is a modified version of the image analysis sequence of FIG. 5A with the results for the modified image analysis sequence.

Referring to FIG. 5B, an object processing step 216 (step 1, "Threshold") has been added to the image analysis sequence 202. A user may configure the parameters 208 of the threshold step as shown. The results display displays the input image 218 (i.e., the selected sample source image 204) and the output image 220 for the threshold operation when the "Test" button 225 is selected. In this example, a user may determine that the results of the threshold operation are not satisfactory because some objects 222 are undesirably merged together in the output image 220. Accordingly, the user may determine that image processing operations are needed to adjust the sample source image 204 before the threshold step 216.

Figure 5C:
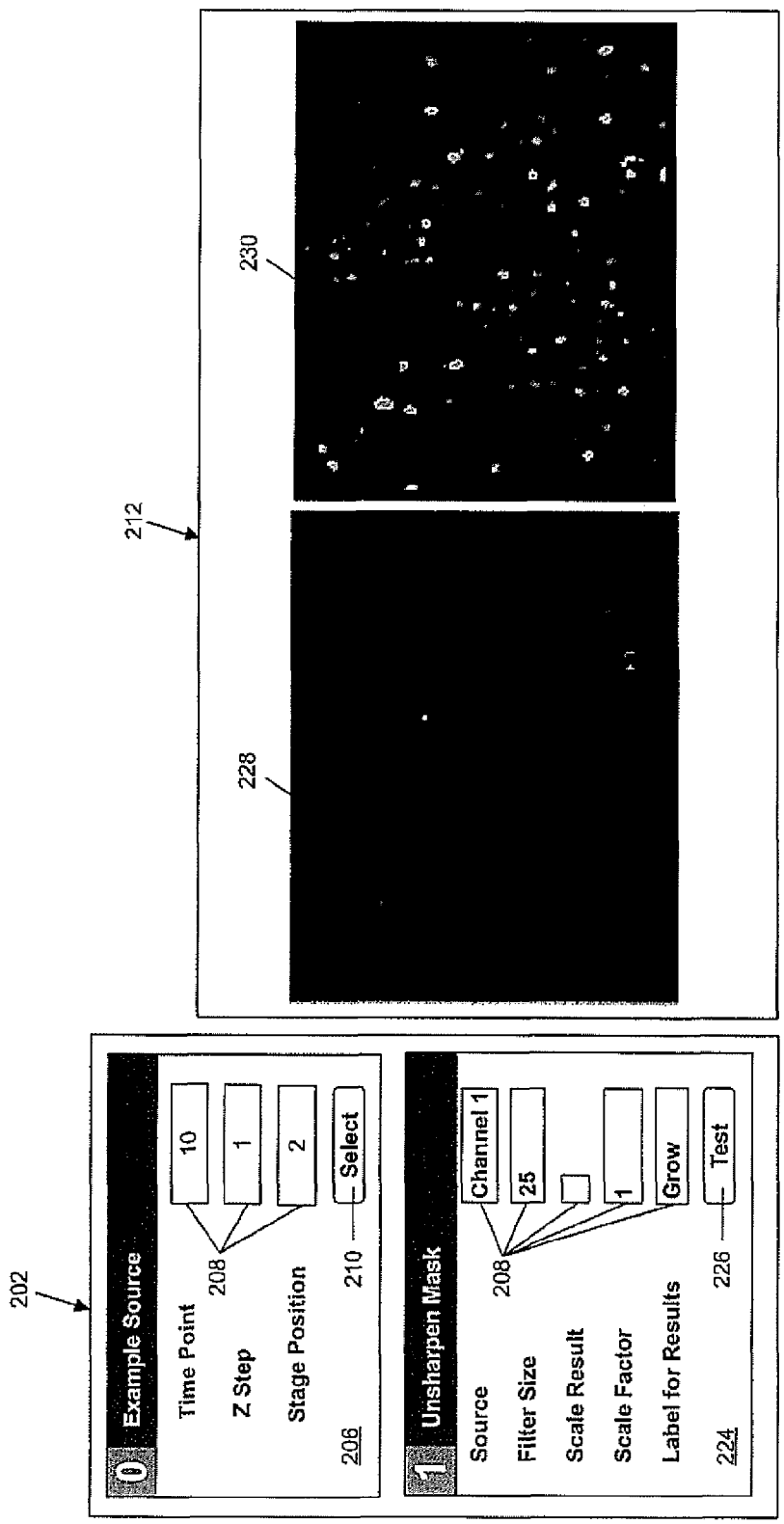
FIG. 5C is a modified version of the image analysis sequence of FIG. 5B with the results for the modified image analysis sequence.

As shown in FIG. 5C, the threshold step 216 in FIG. 5B has been replaced with an image processing step 224 (step 1, "Unsharpen Mask"). The user may configure the parameters 208 for the unsharpen masking step 224 and select the "Test" button 226 to view the results of the image processing step. The results display 212 presents both the input image 228 (i.e., the selected sample source image 204) and the output image 230 for the unsharpen masking operation. In this example, the user may determine that the resulting output image 230 for the unsharpen masking step 224 is not satisfactory and that an additional image processing step is needed before the unsharpen masking step 224.

Figure 5D:
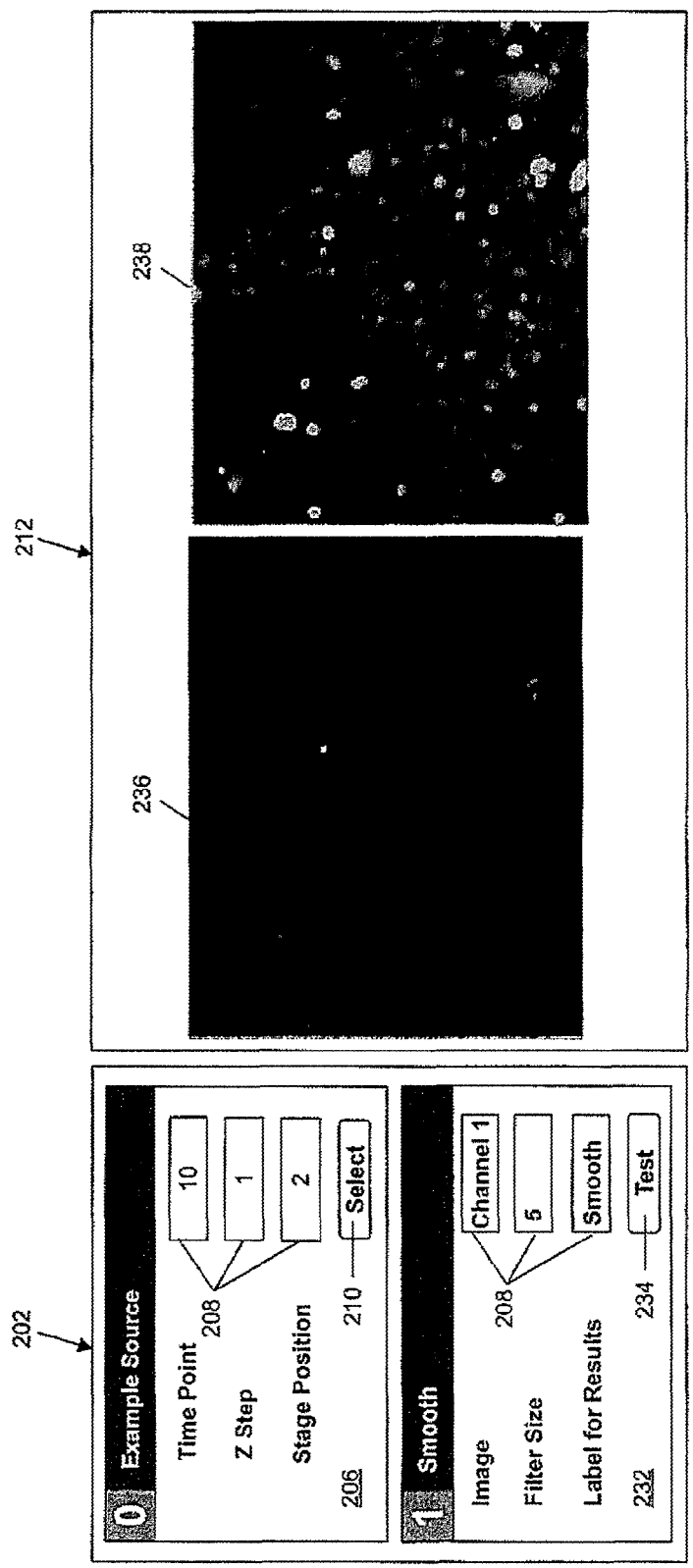
FIG. 5D is a modified version of the image analysis sequence of FIG. 5C with the results for the modified image analysis sequence.

As seen in FIG. 5D, the unsharpen masking step 224 in FIG. 5C has been replaced with an another image processing step 232 (step 1, "Smooth"). Like before, the user may configure parameters 208 of the smoothing step 232 and select the "Test" button 234 to view the results. The results display 212 present both the input image 236 (i.e., the selected sample source image 204) and the output image 238 for the smoothing step 232. In this example, the user may determine that the resulting output image 238 is satisfactory and may be set as the input image for a subsequent unsharpen masking operation.

Figure 5E:
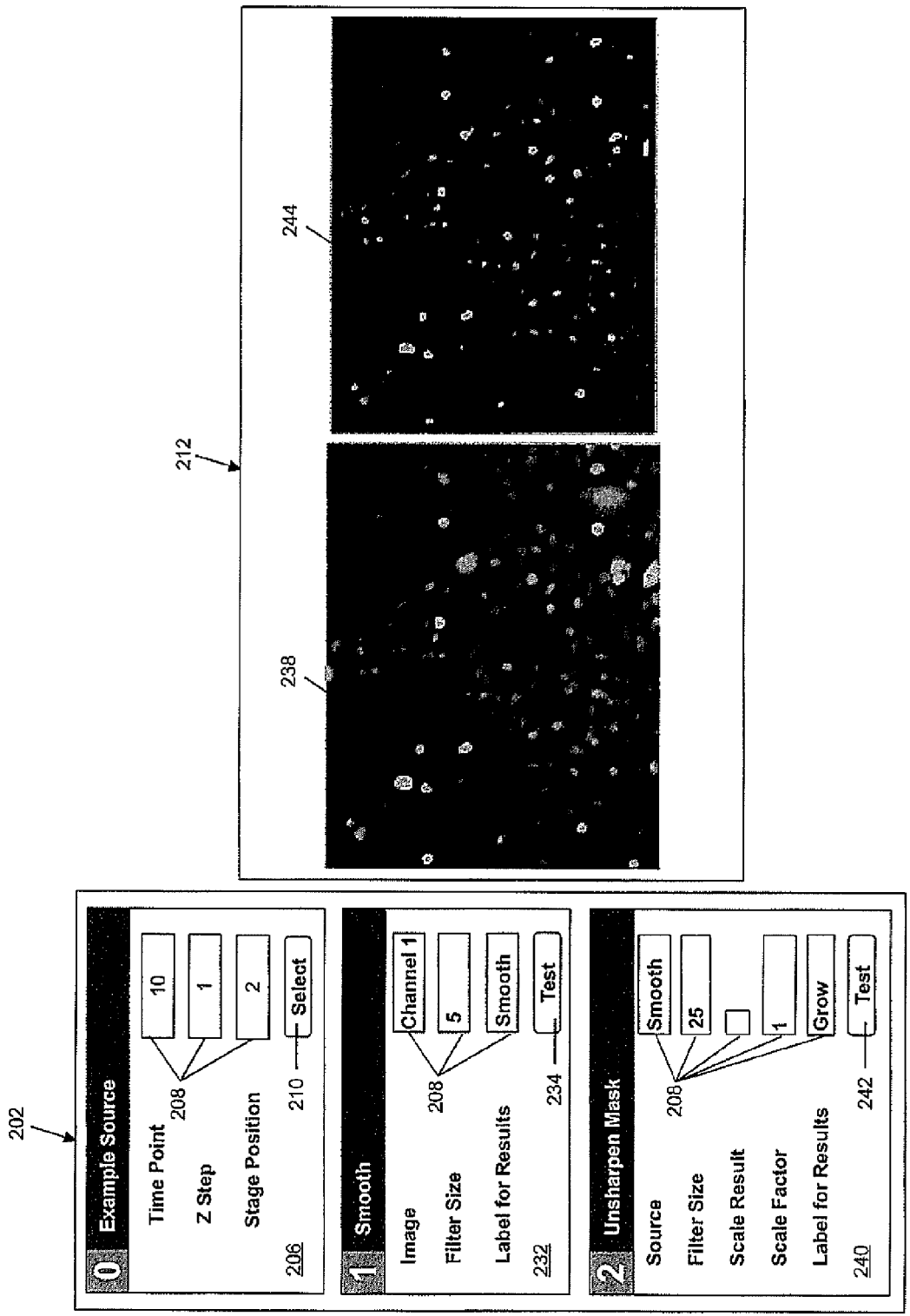
FIG. 5E is a modified version of the image analysis sequence of FIG. 5D with the results for the modified image analysis sequence.

In FIG. 5E, the unsharpen masking step 240 (step 2, "Unsharpen Mask") has been added back to the image analysis sequence 202. As seen in FIG. 5E, the input image ("Source") for the unsharpen masking step 240 (step 2) is set to "Smooth," which sets the output image 238 of the smoothing step 232 (step 1) as the input image for the unsharpen masking step. The user may configure the parameters 208 of the unsharpen masking operation and select the "Test" button 242 to view the results. The results display presents the input image 238 and the output image 244 for the unsharpen masking step 240. In this example, the user may determine that the resulting output image 244 is satisfactory. Accordingly, the user may set the output image 244 as the input image for a subsequent threshold operation to identify the objects in the image.

Figure 5F:
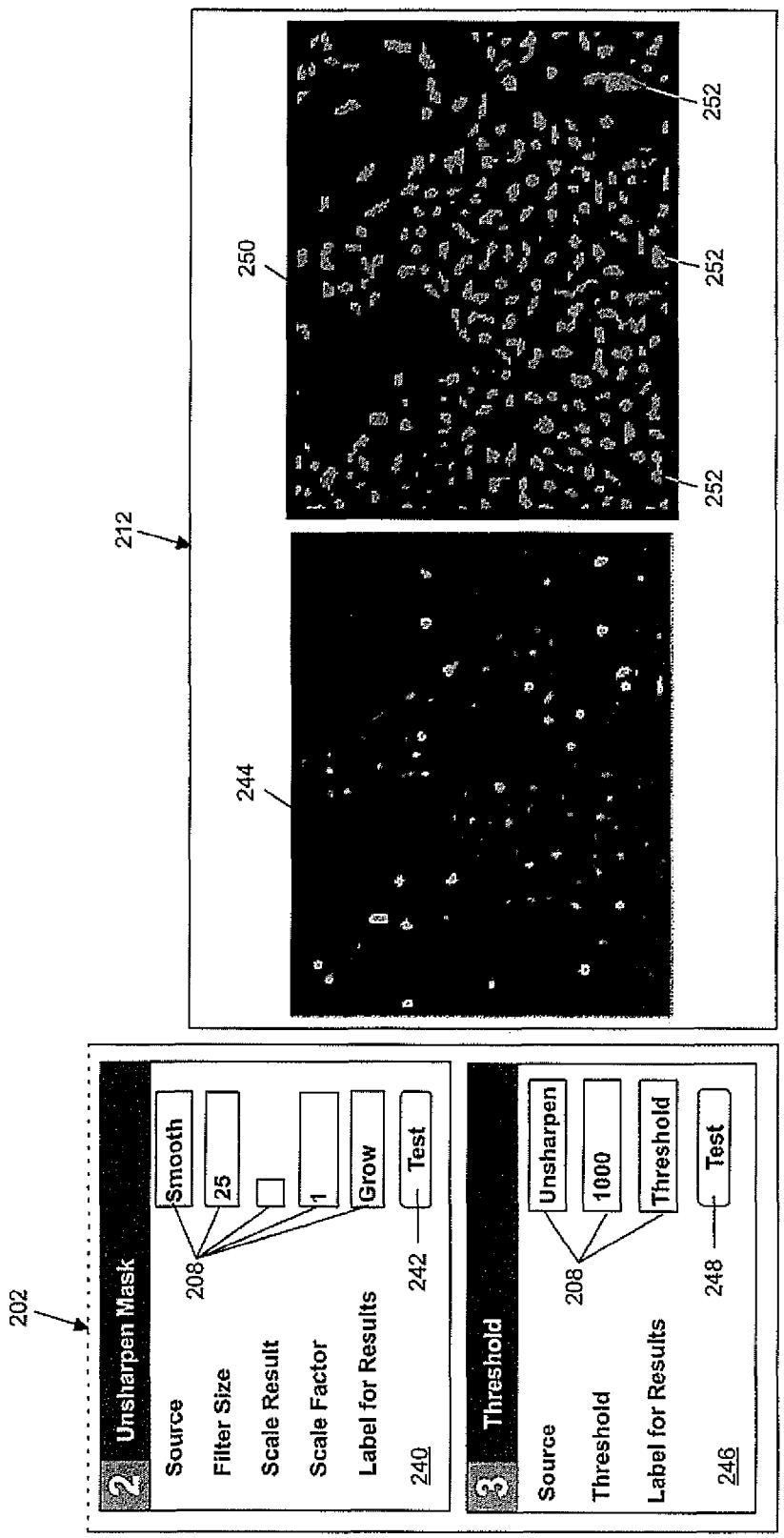
FIG. 5F is a modified version of the image analysis sequence of FIG. 5E with the results for the modified image analysis sequence.

As seen in FIG. 5F, the threshold step 246 (step 3, "Threshold") has been added back to the image analysis sequence 202 to identify the objects in the input image 244. The image processing steps 232 and 240 (step 1 and step 2), in this example, adjust the selected sample source image 204 to improve the results of the threshold operation. As seen in FIG. 5F, the input image for the threshold step 246 (step 3) is set to "Unsharpen Mask," which sets the output image 244 of the unsharpen masking step 240 (step 2) as the input image for the threshold step 246. The user may configure the parameters 208 of the threshold step 246 and select the "Test" button 248 to view the results. The results display 212 presents the input image 244 and the output image 250 for the threshold step 246. In this example, because the image analysis sequence 202 includes image processing step 232 and 240 before the threshold step 246, the output image 250 for the threshold operation in FIG. 5F includes distinct objects 252 that are not undesirably merged together as seen in the output image 220 for the threshold operation in FIG. 5B. Therefore, a user may determine that the output image 250 for the threshold step 246 in FIG. 5E is satisfactory and that the objects identified in the image are ready to be measured and analyzed.

Figure 5G:
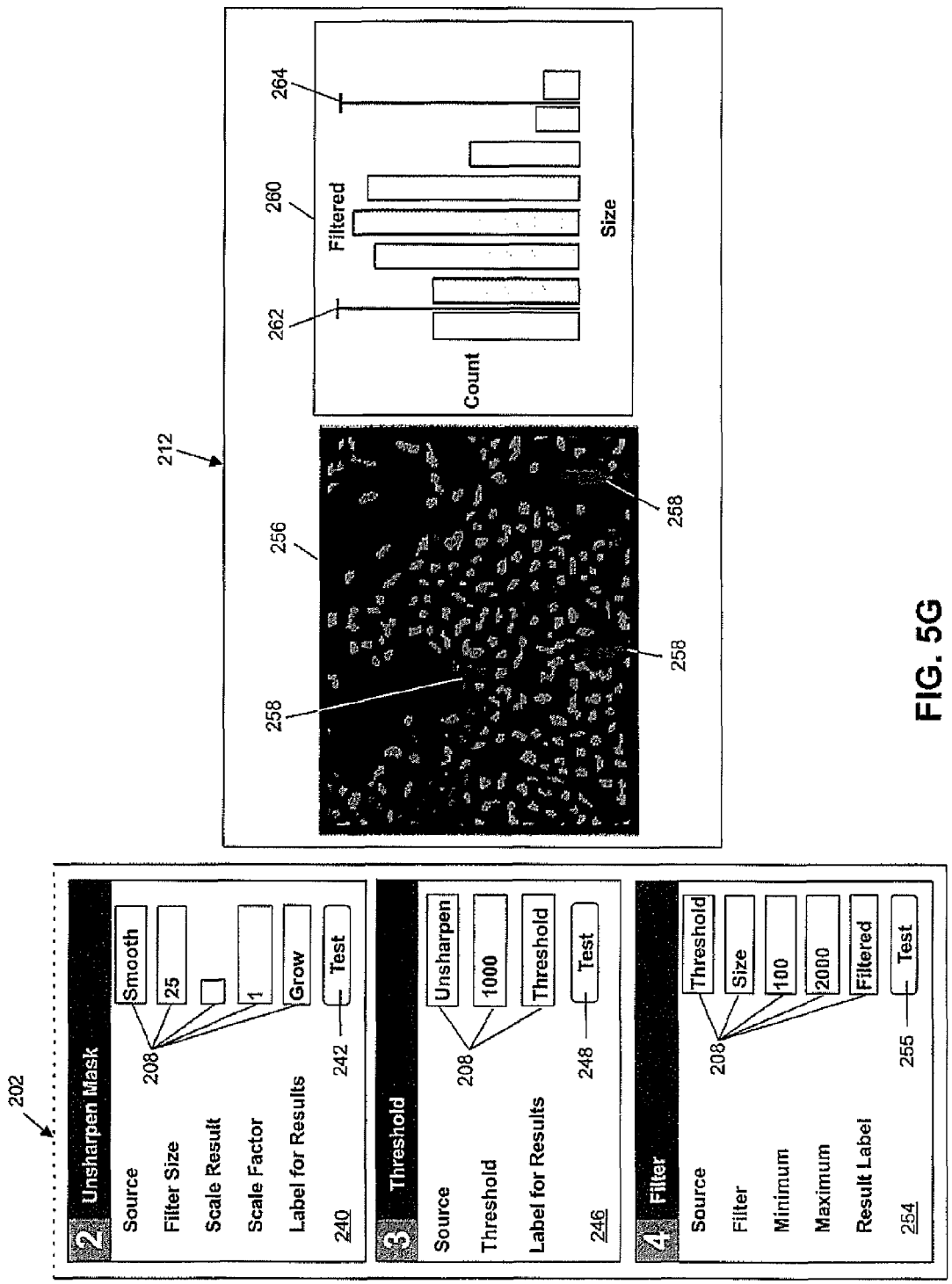
FIG. 5G is a modified version of the image analysis sequence of FIG. 5F with the results for the modified image analysis sequence.

In FIG. 5G, an object processing step 254 (step 4, "Filter") has been added to the image analysis sequence 202 to filter the identified objects 252 in the output image 250. As seen in FIG. 5G, the input image for the filter step 254 (step 4) is set to "Threshold," which sets the output image 250 for the threshold operation (step 3) as the input image for the filter step. The user may configure the parameters 208 for the filter step 254 and select the "Test" button 255 to selectively filter the identified objects 252 in the input image 250. In this example, the filter parameter is set to filter the objects based on object size, and the parameters for the minimum and maximum object size have been respectively set to 100 and 2000. Accordingly, the filter operation, in this example, will filter out identified objects 252 that fall outside the specified minimum and maximum object size. The resulting output image 256 for the filter operation is display in the results display 212. As seen in the example output image 256, the filter operation has removed the highlighting from objects 258 falling outside the specified minimum and maximum object size.

Additionally, the image sequence 202 may include a measurement analysis step (not shown) that counts the number of identified objects having a particular size and generates a graph 260 that includes the results. In FIG. 5G, the results display 212 includes a bar graph that graphs the number of objects in the filtered output image 256 that have a particular size. The bar graph 260 in the example shown also includes an indicator 262 for the minimum object size and an indicator 264 for the maximum object size that illustrate how many objects fall outside of the specified range.

Referring now to FIGS. 6A-D, a flowchart 266 of example method steps for selectively arranging and configuring an image analysis sequence having multiple processing steps is shown. As discussed above, processing steps may include image processing steps, object processing steps, measurement steps, classification steps and measurement analysis steps. Each processing step may be respectively associated with a processing operation (e.g., image processing operations, object processing operations, measurement operations, classification operations, and measurement analysis operations). As the image analysis sequence is constructed, individual processing steps of the image may be configured using one or more input parameters. One of the input parameters may specify the input image for the step. Additionally, while the image analysis sequence is under construction, the steps of the image analysis sequence may be tested. The steps may be tested by executing them individually and observing the results for each step or, additionally or alternatively, by executing the entire image analysis sequence and observing the results for each step in the image analysis sequence as well as the overall results. The input image and output image for a step in the image analysis sequence may be displayed next to each other for comparison. Additionally, all of the output images for the steps of the image analysis sequence may be consecutively displayed in a list so that a user may observe how the output image for one step in the sequence affects the output images for subsequent steps in the sequence. If a user is dissatisfied with the results of any step in the image analysis sequence, the user may modify the image analysis sequence by reconfiguring one or more of the steps, or adding steps to or removing steps from the image analysis sequence.

Figure 6A:
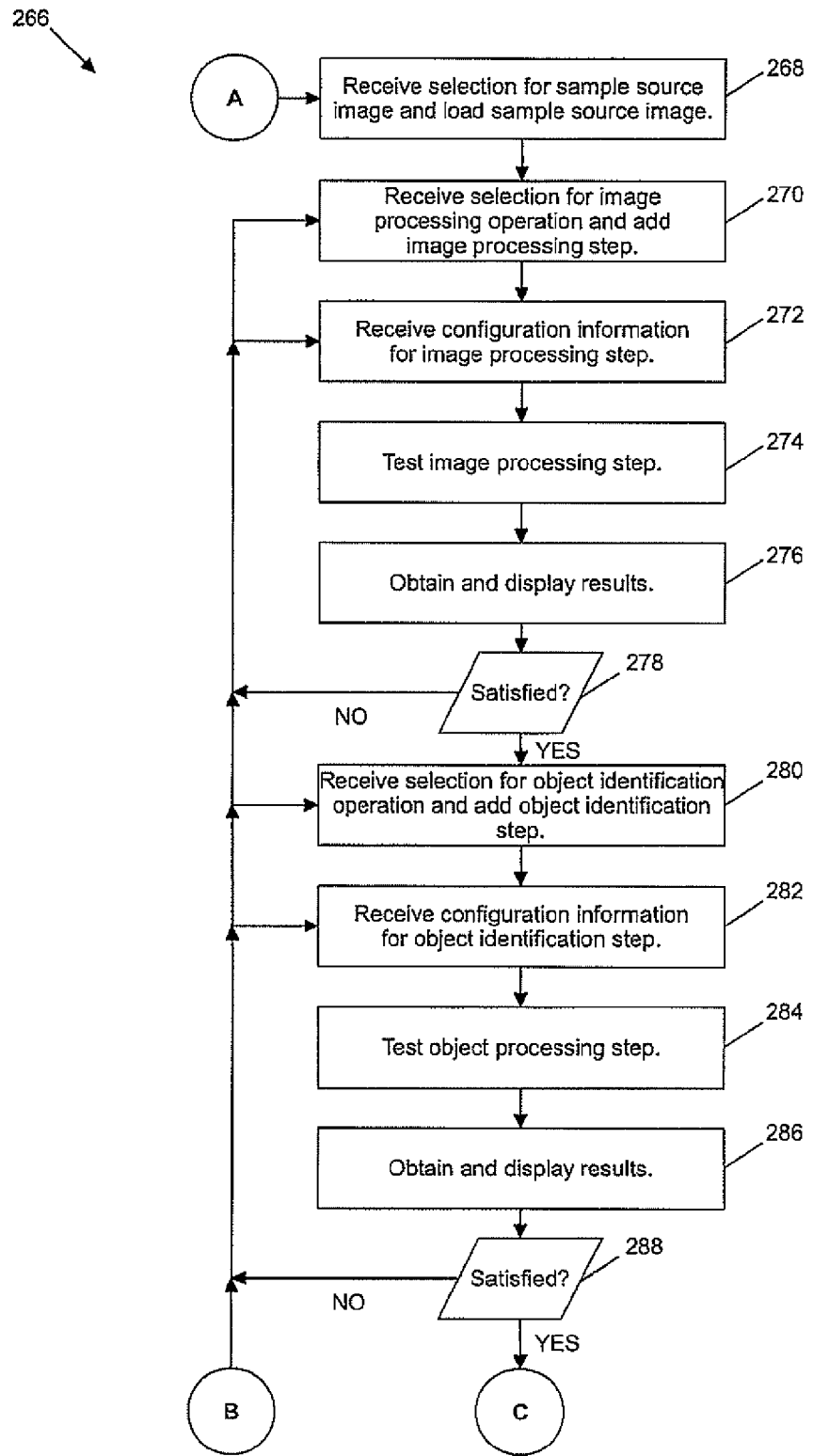
FIG. 6A is a flowchart of example method steps for creating and executing an image analysis sequence.

Referring to FIG. 6A, a selection for a sample source image is received, and the sample source image is loaded for subsequent processing (step 268). The selection may specify one image or multiple images in a set of images. The selection for the sample source image may specify and image directly (e.g., image number 10) or relatively (e.g., a current image minus 1).

Once the sample source image has been selected, a selection for an image processing operation may be received which may be added to the image analysis sequence as an image processing step (step 270). As discussed above, an image processing operation may adjust the image data in an image for subsequent processing. Configuration information may be received to selectively configure the execution of the image processing step (step 272). When the image processing step is configured, the image processing step may be tested (step 274), and the results for the image processing step may then be obtained and displayed (step 276). If the results for the image processing step are unsatisfactory (step 278), a selection for a new processing operation may be received and added to the image analysis sequence as a new image processing step (step 270) or new configuration information for the image processing step may be received (step 272) to modify the image analysis sequence.

Once the results for the image processing steps are satisfactory (step 278), a selection for an object identification operation may be received, and added as an object processing step (step 280). As discussed above, object identification steps may detected objects in an image and determine, for example, which pixels in the image are associated with the identified objects (i.e., object segmentation). Configuration information may be received to selectively configure the execution of the object identification step (step 282). When the object identification step is configured, the object identification step may be tested (step 284), and the results for the object identification step may then be obtained and displayed (step 286). If the results of the object identification step are not satisfactory (step 288), the image analysis sequence may be modified. New selections or new configuration information may be received for an image processing step or an object identification step (steps 270-278 and 280-288).

Figure 6B:
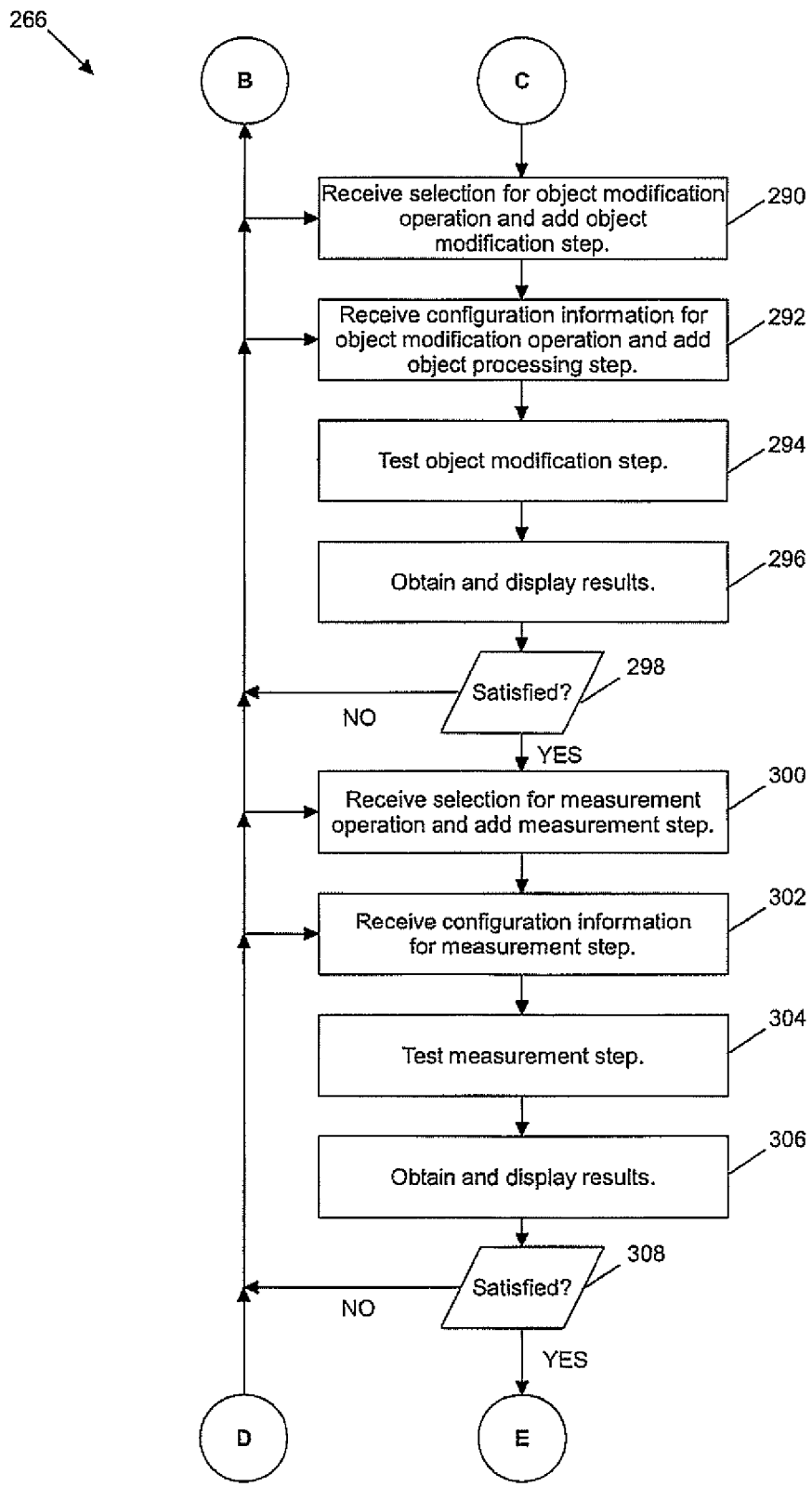
FIG. 6B is a continuation of the flowchart of FIG. 6A.

Referring to FIG. 6B, a selection for an object modification operation may be received and added as an object processing step to the image analysis sequence (step 290), when the results for the object identification operations are satisfactory (step 288). As discussed above, object modification steps may, for example, adjust the image data for a segmentation associated with an object. Configuration information may be received to selectively configure the execution of the object modification step (step 292). When the object modification step is configured, the object modification step may be tested (step 294), and the results for the object modification step may then be obtained and displayed (step 296). If the results for the object modification step are not satisfactory (step 298), the image analysis sequence may be modified. New selections or new configuration information may be received for an image processing step, an object identification step, or an object modification step (steps 270-278, 280-288, and 290-298).

When the results of the object modification steps are satisfactory (step 298), a selection for a measurement operation may be received and added as a measurement step to the image analysis sequence (step 300). As discussed above, measurement steps may measure the identified objects in an image. Configuration information may be received to selectively configure the execution of the measurement step (step 302). When the measurement step is configured, the measurement step may be tested (step 304), and the results for the measurement step may then be obtained and displayed (step 306). If the results of the measurement step are not satisfactory (step 308), the image analysis sequence may be modified. New selections or new configuration information may be received for an image processing step, an object identification step, an object modification step, or a measurement step (s steps 270-278, 280-288, 290-298, and 300-308).

Figure 6C:
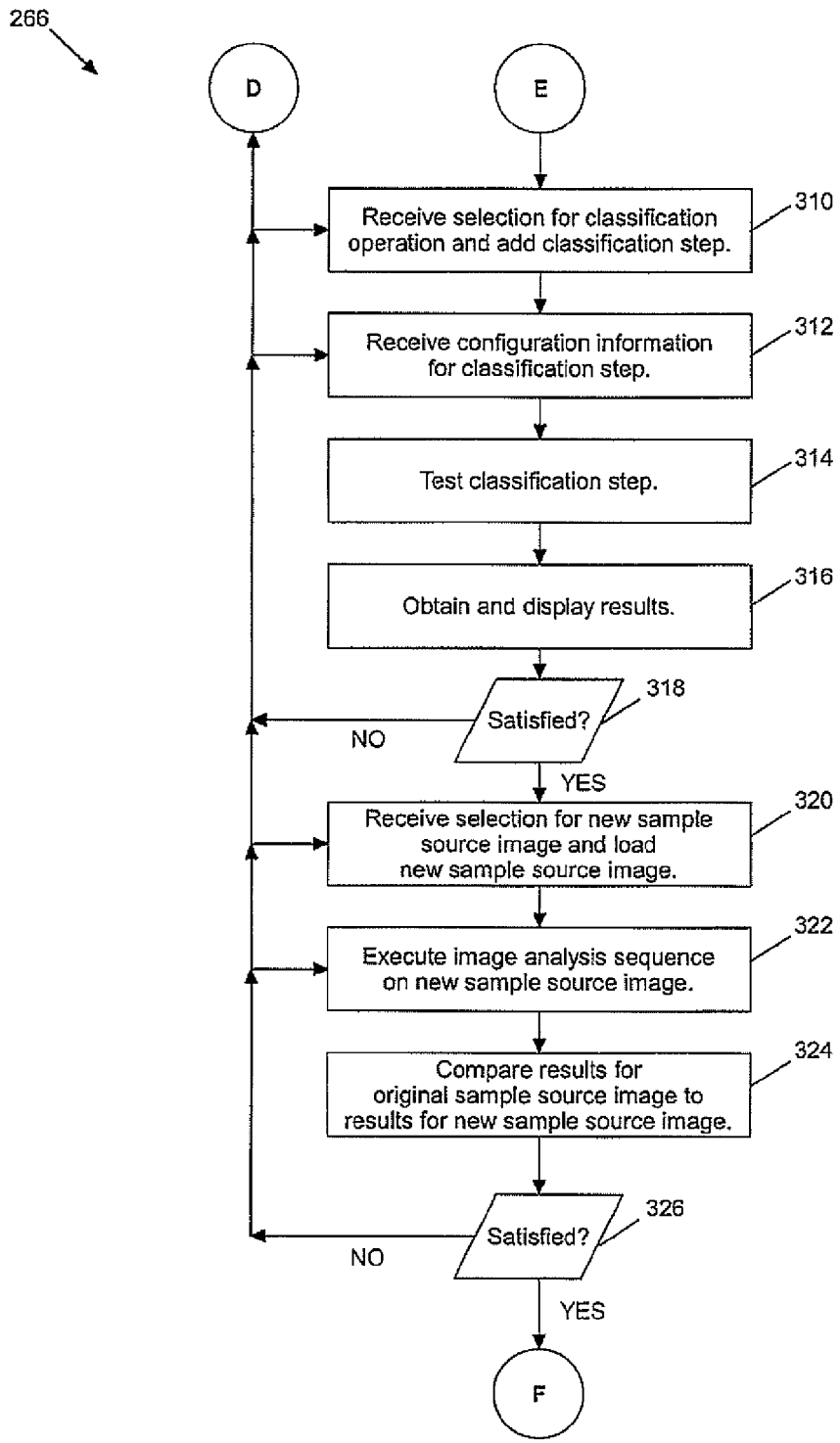
FIG. 6C is a continuation of the flowchart of FIG. 6B.

As seen in FIG. 6C, a selection for a classification operation may be received and added as a classification step to the image analysis sequence (step 310) once the results for the measurement operations are satisfactory (step 308). Classification steps may classify or categorize detected objects in an image. Configuration information may be received to selectively configure the execution of the classification step (step 312). When the classification step is configured, the classification step may be tested (step 314), and the results for the classification step may then be obtained and displayed (step 316). If the results of the classification step are not satisfactory (step 318), the image analysis sequence may be modified. New selections or new configuration information may be received for an image processing step, an object identification step, an object modification step, a measurement step, or a classification step (270-278, 280-288, 290-298, 300-308, and 310-318).

If the results for the classification steps are satisfactory (step 318), the image analysis sequence may be tested with a new sample source image. A selection for a new sample source image may be received and the new sample source image may be loaded for subsequent processing (step 320). The image analysis sequence may then be executed on the new sample source image (step 322), and the results for the original sample source image and the new sample source image may be compared (step 324). If the results for the new sample source image are unsatisfactory (step 326), the image analysis sequence may be modified as described above. If the results for the new sample source image are satisfactory (step 326), then the image analysis sequence may be executed over a series of images in an image data set.

Figure 6D:
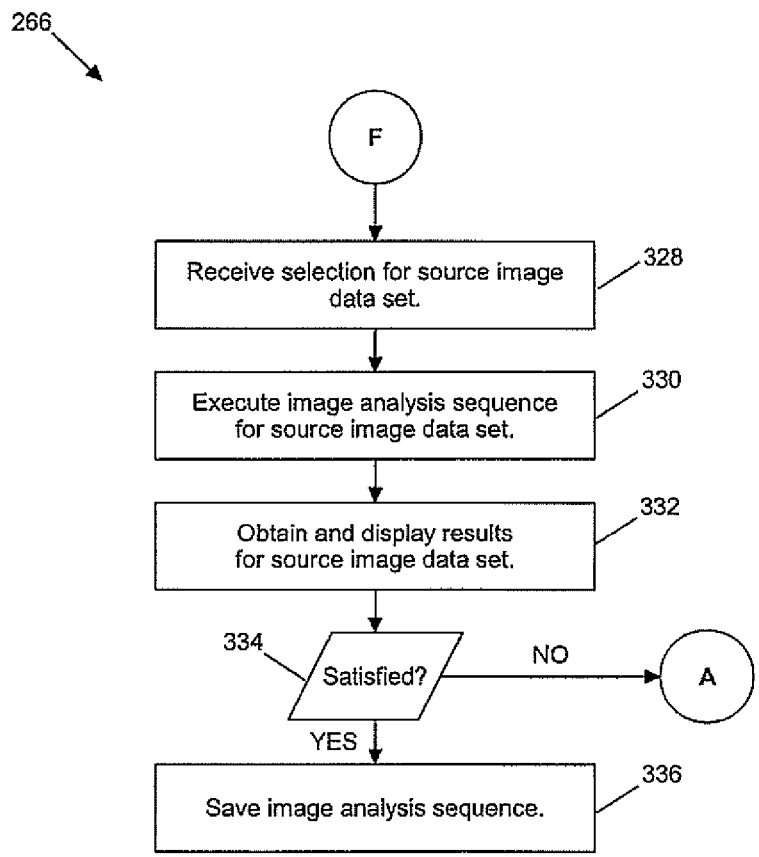
FIG. 6D is a continuation of the flowchart of FIG. 6C.

Referring to FIG. 6D, a selection for an image data set is received (step 328). The image data set may include a series of images for processing and analysis using the image analysis sequence under construction. The image analysis sequence under construction may be executed for each image in the image data set (step 330), and the results may be obtained and displayed (step 332). If the results of the image analysis sequence for the image data set are unsatisfactory (step 334), the image analysis sequence may be modified as described above. If the results of the image analysis sequence for the image data set are satisfactory (step 334), then the image analysis sequence may be saved (step 336) and used to process additional images and image data sets.

It will be understood that the method set forth above may be performed to create a variety of different image analysis sequences that process and analyze biological images for a variety of applications. Some example applications include: analyzing cell images acquired under varying illumination conditions (i.e., on multiple channels) to determine whether objects identified in one channel overlap objects identified in another channel; measuring a change in intensity of objects across a time-domain series of images; measuring relative changes in intensity by selecting an image relative to a time point (e.g., current time point minus one) and comparing it to the image for the current time point; processing and analyzing user-defined regions of interest by receiving user input identifying the regions of an image to process and analyze; and correcting image properties (e.g., shading) using a reference image.

It will be understood and appreciated that one or more of the processes, sub-processes, and process steps described in connection with FIGS. 1, 2A-B, 3, 4A-C, 5A-G, and 6A-D may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub-modules schematically depicted in FIG. 1. The software memory may include an ordered listing of executable instructions for implementing logical functions (that is, "logic" that may be implemented with in digital form such as digital circuitry or source code, or in analog form such as analog source such as an analog electrical, sound, or video signal). The instructions may be executed within a processing module, which includes, for example, one or more microprocessors, general purpose processors, combinations of processors, DSPs, or ASICs. Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., an image analysis system 100 in FIG. 1), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include: an electrical connection having one or more wires (electronic); a portable computer diskette (magnetic); a random access memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "in signal communication" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A computer implemented method of processing a selected image using a plurality of processing operations comprising:

constructing an image analysis sequence having a plurality of processing steps, the image analysis sequence is constructed in response to receipt of a plurality of processing operation solutions wherein individual processing steps in the image analysis sequence are associated with a processing operation indicated in a corresponding processing operation selection;

arranging the processing steps of the image analysis sequence in response to receipt of arrangement information that relates to selective arrangement of the processing steps;

configuring at least one of the processing steps in the image analysis sequence such that the processing operation associated with the processing step processes a specified input image to generate an output image when the processing step is performed, wherein a first processing operation associated with a first processing step in the image analysis sequence generates an output when the first processing step is performed;

setting an input of a second processing step to the output of the first processing step such that a second processing operation associated with the second processing step processes the output for the first processing operation when the second processing step is performed and wherein:

the output of the first processing operation associated with the first processing step is a processed output image, the processed output image of the first processing operation is set as the input for the second processing step such that the second processing operation associated with the second processing step processes the input when the second processing step is performed, and the second processing operation associated with the second processing step generates a second processed output image when the second processing step is performed; and generating a display signal for display of the output image at a display device, the display signal includes the input for the second processing step and the second processed output image for the second processing step such that the input and the second output image are displayed simultaneously when the display signal is displayed at the display device.

2. The computer-implemented method of claim 1 wherein arranging the processing steps of the image analysis sequence in response to receipt of user provided arrangement information comprise a sequential order of the processing steps of the image analysis sequence that is re-configurable by the user and the total number of processing steps of the image analysis sequence is selectively modifiable by the user to enable the user to arbitrarily organize each image analysis sequence.

3. The computer-implemented method of claim 1 wherein:
the output of the first processing operation associated with the first processing step is a group of objects identified in the selected image; and
the group of objects is set as the input for the second processing step such that the second processing operation associated with the second processing step processes the group of objects when the second processing step is performed.

4. The computer-implemented method of claim 1 wherein the plurality of processing operations include at least one of:
an image processing operation that processes image data in the image;
an object processing operation that identifies one or more objects in the image;
a measurement operation that measures the one or more objects in the image to generate measurement data;
a classification operation that classifies the one or more objects in the image based on the measurement data; and
a measurement analysis operation that performs a statistical analysis of measurement data.

5. The computer-implemented method of claim 1 wherein the selected image is a microscopy image and further comprising:
receiving the microscopy image from a bioanalytical instrument that performs cellular imaging to generate the microscopy image.

6. The computer-implemented method of claim 1 further comprising storing a representation of the image analysis sequence in an XML file at a memory module.

7. An image analysis system for processing a selected image comprising:
a processing operation library that provides a plurality of processing operations that respectively process the selected image when the processing operations are executed;
an image analysis sequence module that, in response to receipt of a plurality of processing operation selections, constructs an image analysis sequence having a plurality of processing steps wherein the individual processing steps in the image analysis sequence are associated with a processing operation indicated in a corresponding processing operation selection;
wherein the image analysis sequence module arranges the processing steps in the image analysis sequence in response to receipt of user provided arrangement information that relates to a selective arrangement of the processing steps, wherein a sequential order of the processing steps of the image analysis sequence is re-configurable by the user and the total number of processing steps of the image analysis sequence is selectively modifiable by the user to enable the user to arbitrarily organize each image analysis sequence constructed by the image analysis sequence module; and
wherein the image analysis sequence module configures at least one of the processing steps in the image analysis sequence in response to receipt of configuration information such that the processing operation associated with the processing step processes a specified input image to generate an output image when the processing step is performed; and
wherein a display signal is generated for display of the output image at a display device; and wherein:
the image analysis sequence includes a first processing step associated with a first processing operation and a second processing step associated with a second processing operation;
the first processing operation generates an output when the first processing step is performed;
the image analysis sequence module sets an input of the second processing step to the output of the first processing step in response to receipt of configuration information such that the second processing operation processes the output for the first processing operation when the second processing step is performed;
the output of the first processing operation associated with the first processing step is a processed output image;
the image analysis sequence module sets the processed output image as the input for the second processing step in response to receipt of configuration information such that the second processing operation processes the processed output image when the second processing step is performed;
the second processing operation associated with the second processing step generates a second processed output image when the second processing step is performed; and
the display signal includes the input for the second processing step and the second processed output image for the second processing step such that the input and the second processed output image are displayed simultaneously when the display signal is displayed at the display device.

8. The image analysis system of claim 7 wherein:
the output of the first processing operation associated with the first processing step is a group of objects identified in the selected image; and
the image analysis sequence module sets the group of objects as the input for the second processing step in response to receipt of configuration information such that the second processing operation associated with the second processing step processes the group of objects when the second processing step is performed.

9. The image analysis system of claim 7 wherein the plurality of processing operations of the processing operation library include at least one of:
an image processing operation that processes image data in the image;
an object processing operation that identifies one or more objects in the image;
a measurement operation that measures the one or more objects in the image to generate measurement data;
a classification operation that classifies the one or more objects in the image based on the measurement data; and
a measurement analysis operation that performs a statistical analysis of measurement data.

10. The image analysis system of claim 7 wherein:
the selected image is a microscopy image; and the image analysis sequence module receives the microscopy image from a bioanalytical instrument that performs cellular imaging to generate the microscopy image.

11. The image analysis system of claim 7 further comprising a memory module that stores a representation of the image analysis sequence as an XML file.

* * * * *